United States Patent
Yang et al.

(10) Patent No.: US 9,392,507 B2
(45) Date of Patent: *Jul. 12, 2016

(54) METHOD, APPARATUS AND SYSTEM FOR RELOCATING USER EQUIPMENT BETWEEN RADIO NETWORK CONTROLLERS

(71) Applicant: Huawei Technologies Co., Ltd., Shenzhen (CN)

(72) Inventors: Yinghong Yang, Shanghai (CN); Dong Chen, Shanghai (CN); Xiaoying Xu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/853,637

(22) Filed: Sep. 14, 2015

(65) Prior Publication Data

US 2016/0007246 A1    Jan. 7, 2016

Related U.S. Application Data

(63) Continuation of application No. 14/324,946, filed on Jul. 7, 2014, now Pat. No. 9,167,490, which is a continuation of application No. PCT/CN2012/084637, filed on Nov. 15, 2012.

(30) Foreign Application Priority Data

Jan. 5, 2012 (CN) .......................... 2012 1 0002252
Apr. 27, 2012 (CN) .......................... 2012 1 0128354

(51) Int. Cl.
*H04W 36/00* (2009.01)
*H04W 36/10* (2009.01)
*H04W 88/02* (2009.01)
*H04W 88/12* (2009.01)

(52) U.S. Cl.
CPC ...... *H04W 36/0061* (2013.01); *H04W 36/0055* (2013.01); *H04W 36/10* (2013.01); *H04W 88/02* (2013.01); *H04W 88/12* (2013.01)

(58) Field of Classification Search
CPC ..................................................... H04W 36/12
USPC ........................... 455/436–444; 370/331–334
See application file for complete search history.

(56) References Cited

U.S. PATENT DOCUMENTS

| | | | |
|---|---|---|---|
| 6,618,589 B1 * | 9/2003 | Rune et al. | 455/435.1 |
| 2003/0003919 A1 * | 1/2003 | Beming et al. | 455/446 |
| 2004/0146033 A1 * | 7/2004 | Soderstrom et al. | 370/338 |
| 2006/0035645 A1 * | 2/2006 | Kim | 455/452.1 |
| 2006/0080387 A1 * | 4/2006 | Sipila et al. | 709/203 |
| 2014/0126537 A1 * | 5/2014 | Chen et al. | 370/331 |

* cited by examiner

*Primary Examiner* — Charles Shedrick
(74) *Attorney, Agent, or Firm* — Leydig, Voit & Mayer, Ltd.

(57) ABSTRACT

The present disclosure, relating to the field of communications technologies, discloses a method, an apparatus, and a system for relocating a user equipment between radio network controllers. The present disclosure is directed to configuring the coding scheme configured for the user equipment UE to a coding scheme consistent with the coding scheme supported by a target radio network controller to relocate the UE to the target RNC. The present disclosure is mainly applicable to inter-RNC handovers.

12 Claims, 11 Drawing Sheets

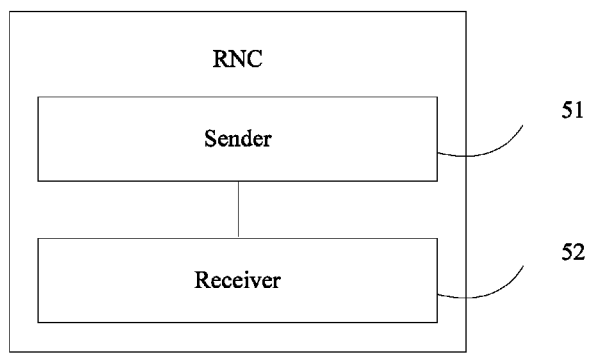

FIG. 5

When a relocation process is initiated, if the radio links of a UE are under control of the target RNC, the source RNC determines that the source RNC does not know a coding scheme supported by the target RNC or determines that a coding scheme configured for the UE is inconsistent with the coding scheme supported by the target RNC — 601

The source RNC initiates a UE-involved RNC relocation process — 602

FIG. 6

METHOD, APPARATUS AND SYSTEM FOR RELOCATING USER EQUIPMENT BETWEEN RADIO NETWORK CONTROLLERS

CROSS-REFERENCE TO RELATED APPLICATIONS

This application is a continuation of pending U.S. patent application Ser. No. 14/324,946, filed on Jul. 7, 2014, which is a continuation of International Patent Application No. PCT/CN2012/084637, filed on Nov. 15, 2012. The International Patent Application claims priority to Chinese Patent Application No. 201210002252.9, filed on Jan. 5, 2012, and Chinese Patent Application No. 201210128354.5, filed on Apr. 27, 2012. The afore-mentioned patent applications are hereby incorporated by reference in their entireties.

TECHNICAL FIELD

The present disclosure relates to the field of communications technologies, and in particular, to a method, an apparatus, and a system for relocating a user equipment between radio network controllers.

BACKGROUND

In a universal mobile telecommunications system (UMTS), a radio link from a user equipment (UE) to a core network (CN) is set up using a radio bearer (RB) set up between an access node and a radio network controller (RNC) and a radio access bearer (Radio Access Bearer, RAB) set up between the RNC and the CN, thereby implementing circuit switched domain services of the UE.

After the radio link from the UE to the CN over the RNC is established, the RNC relocates the UE active in a circuit switched domain service to another RNC according to the power load status of the access network and/or the core network. The source RNC and the target RNC may support different voice coding schemes and the coding scheme configured for the UE is the same as the coding scheme supported by the source RNC. Therefore, when the voice coding scheme supported by the target RNC is different from that supported by the source RNC, the coding scheme of the UE and the coding scheme of the target RNC need be unified in the process of relocating the UE from the source RNC to the target RNC. This keeps a consistent coding scheme between the UE and the target RNC.

In a prior art, during the relocation of a UE between RNCs, the source RNC notifies the target RNC of the coding scheme configured for the UE and the source RNC through the CN, the CN selects a coding scheme supported by both the UE and the target RNC as the coding scheme used for RB setup between the UE and the target RNC according to the coding scheme configured for the UE and the coding scheme supported by the target RNC. In a UE-involved RNC relocation process (UE Involved in Relocation of SRNS), if the coding scheme indicated by the CN for the target RNC is inconsistent with the coding scheme used by the UE and the source RNC, the target RNC reconfigures the coding scheme for the UE to a coding scheme consistent with the coding scheme indicated by the CN for the target RNC before performing RNC relocation of the UE. In a UE-not-involved RNC relocation process (UE not Involved in Relocation of SRNS), if the coding scheme indicated by the CN for the target RNC is inconsistent with the coding scheme used by the UE and the source RNC, the target RNC rejects the relocation of the UE directly.

During the implementation of the relocation of a UE between RNCs with different coding schemes, the inventor discovers that the prior art has at least the following problem: when the radio link carrying the circuit switched domain services of the UE is controlled by the target RNC, only the UE-not-involved RNC relocation process (UE not Involved in Relocation of SRNS) can be implemented, in which case, if the coding scheme configured for the UE and the coding scheme indicated by the CN for the target RNC are inconsistent, the UE cannot be relocated to the target RNC.

SUMMARY

Embodiments of the present disclosure provide a method, an apparatus, and a system for relocating a user equipment between radio network controllers, which ensure that a UE is successfully relocated to a target RNC when a coding scheme configured for the UE is inconsistent with a coding scheme configured by a CN.

In one aspect, the present disclosure provides a method for relocating a UE between radio network controllers, comprising: receiving a UE-not-involved RNC relocation required message, wherein the required message comprises a transparent container from a source RNC to a target RNC sent by the source RNC and a coding scheme indicated by a CN, wherein the transparent container comprises a coding scheme configured for the UE; and if the coding scheme configured for the UE is inconsistent with the coding scheme indicated by the CN, sending the source RNC a transparent container from the target RNC to the source RNC, where the transparent container comprises a reconfiguration message used to change the coding scheme of the UE, so that the source RNC sends a reconfiguration message to the UE.

In another aspect, the present disclosure provides another method for relocating a UE between radio network controllers, comprising: sending a UE-not-involved RNC relocation required message to a CN, so that the CN sends a relocation request message to the target RNC; receiving a relocation command message sent by the CN, wherein the relocation command message comprises a transparent container from the target RNC to a source RNC sent by the target RNC, wherein the transparent container comprises a UE coding scheme reconfiguration message; and sending a reconfiguration message to the UE, so that the UE changes the coding scheme according to the reconfiguration message.

In another aspect, the present disclosure provides another method for relocating a UE between radio network controllers comprising: when a relocation is initiated, if radio links of the UE are under control of a target RNC, determining that a source RNC does not know a coding scheme supported by the target RNC, or determining that a coding scheme configured for the UE is inconsistent with the coding scheme supported by the target RNC, or determining that the UE is provided with a wideband adaptive multi-rate bearer; and initiating a UE-involved RNC relocation process.

In another aspect, the present disclosure provides another method for relocating a UE between radio network controllers, comprising: receiving a UE-not-involved RNC relocation required message sent by a source RNC; and, if a coding scheme configured for the UE is inconsistent with a coding scheme supported by a target RNC, sending a relocation failure message sent by the source RNC, so that the source RNC initiates a UE-involved RNC relocation process according to the relocation failure message.

In another aspect, the present disclosure provides another method for relocating a UE between radio network controllers, comprising: receiving a request message sent by a source RNC; sending a UE coding scheme reconfiguration message to the source RNC, so that the source RNC reconfigures the coding scheme for the UE; and receiving a UE-not-involved RNC relocation required message sent by the source RNC to complete a UE-not-involved RNC relocation process.

In another aspect, the present disclosure provides another method for relocating a UE between radio network controllers, comprising: sending a request message to a CN; receiving a reconfiguration message sent by the CN; reconfiguring the coding scheme for the UE according to the reconfiguration message; and initiating a UE-not-involved RNC relocation process.

In another aspect, the present disclosure provides a RNC, comprising: a receiver, configured to receive a UE-not-involved RNC relocation required message, wherein the required message comprises a transparent container from a source RNC to a target RNC sent by the source RNC and a coding scheme indicated by a CN, wherein the transparent container comprises a coding scheme configured for the UE; and a sender, configured to send to the source RNC a transparent container from the target RNC to the source RNC, wherein the transparent container comprises a reconfiguration message used to change the coding scheme of the UE, so that the source RNC sends a reconfiguration message to the UE.

In another aspect, the present disclosure provides RNC, comprising: a sender, configured to send a UE-not-involved RNC relocation required message to a CN, so that the CN sends a relocation request message to a target RNC; and a receiver, configured to receive a relocation command message sent by the CN, wherein the relocation command message comprises a transparent container from the target RNC to a source RNC sent by the target RNC, wherein the transparent container comprises a UE coding scheme reconfiguration message; The sender is further configured to send a reconfiguration message to the UE, so that the UE changes the coding scheme according to the reconfiguration message.

In another aspect, the present disclosure provides a RNC, comprising: a judger, configured to determine that a source RNC does not know a coding scheme supported by a target RNC, or determine that a coding scheme configured for a UE is inconsistent with the coding scheme supported by the target RNC, or determine that the UE is provided with a wideband adaptive multi-rate bearer; and a processor, configured to initiate a UE-involved RNC relocation process.

In another aspect, the present disclosure provides a CN, comprising: a receiver, configured to receive a UE-not-involved RNC relocation required message sent by a source RNC; and a sender, configured to send a relocation failure message to the source RNC, so that the source RNC initiates a UE-involved RNC relocation process according to the relocation failure message.

In another aspect, the present disclosure provides a CN, comprising: a receiver, configured to receive a request message sent by a source RNC; and a sender, configured to send a UE coding scheme reconfiguration message to the source RNC, so that the source RNC reconfigures a coding scheme for the UE. The receiver is further configured to receive a UE-not-involved RNC relocation required message sent by the source RNC to complete a UE-not-involved RNC relocation process.

In another aspect, the present disclosure provides a RNC, comprising: a sender, configured to send a request message to a CN; a receiver, configured to receive a reconfiguration message sent by the CN; and a processor, configured to reconfigure a coding scheme for a UE according to the reconfiguration message. The processor is further configured to initiate a UE-not-involved RNC relocation process.

In another aspect, the present disclosure provides a system for relocating a UE between radio network controllers, comprising: a target RNC, configured to receive a UE-not-involved RNC relocation required message, wherein the relocation required message comprises a transparent container from a source RNC to the target RNC sent by the source RNC and a coding scheme indicated by a CN, wherein the transparent container comprises a coding scheme configured for the UE; and if the coding scheme configured for the UE is inconsistent with the coding scheme indicated by the CN, send the source RNC a transparent container from the target RNC to the source RNC, wherein the transparent container comprises a reconfiguration message used to change the coding scheme of the UE, so that the source RNC sends a reconfiguration message to the UE; and the source RNC, configured to send a UE-not-involved RNC relocation required message to the CN, so that the CN sends a relocation request message to the target RNC; receive a relocation command message sent by the CN, wherein the relocation command message comprises the transparent container from the target RNC to the source RNC sent by the target RNC, which comprises the UE coding scheme reconfiguration message; and send the reconfiguration message to the UE so that the UE changes the coding scheme according to the reconfiguration message.

In another aspect, the present disclosure provides a system for relocating a UE between radio network controllers, comprising: a source RNC, configured to, when a relocation is initiated, if radio links of the UE are under control of a target RNC, determine that the source RNC does not know a coding scheme supported by the target RNC, or determine that a coding scheme configured for the UE is inconsistent with the coding scheme supported by the target RNC, or determine that the UE is provided with a wideband adaptive multi-rate bearer; and a CN, configured to receive a UE-not-involved RNC relocation required message sent by the source RNC, and if the coding scheme configured for the UE is inconsistent with the coding scheme supported by the target RNC, send a relocation failure message to the source RNC, so that the source RNC initiates a UE-involved RNC relocation process according to the relocation failure message.

In another aspect, the present disclosure provides a system for relocating a UE between radio network controllers, comprising: a CN, configured to receive a request message sent by a source RNC, and send a UE coding scheme reconfiguration message to the source RNC so that the source RNC reconfigures the coding scheme for the UE; and receive a UE-not-involved relocation required message sent by the source RNC to complete a UE-not-involved RNC relocation process; and the source RNC, configured to send the required message to the CN, receive the reconfiguration message sent by the CN, reconfigure the coding scheme for the UE according to the reconfiguration message, and initiate the UE-not-involved RNC relocation process.

With the method, apparatus, and system for relocating a UE between radio network controllers provided in the embodiments of the invention, when the coding scheme configured for a UE is inconsistent with the coding scheme indicated by the CN for the UE and the target RNC, the coding scheme configured for the UE can be reconfigured to a coding scheme consistent with the coding scheme indicated by the CN for the UE and the target RNC, and then a UE-not-involved RNC relocation can be initiated. Or, when the coding scheme configured for a UE is inconsistent with the coding scheme indicated by the CN for the UE and the target RNC, a UE-involved RNC relocation process is initiated and the coding scheme configured for the UE is reconfigured to a coding scheme consistent with the coding scheme indicated by the CN for the UE and the target RNC through the UE-involved RNC relocation process. This overcomes the problem in the prior art that the coding scheme cannot be reconfigured for the UE in a UE-not-involved RNC relocation process when the radio links of circuit switched domain services of the UE are already under control of the target RNC, and ensures that the UE is successfully relocated to the target RNC when the coding scheme configured for the UE is inconsistent with the coding scheme configured by the CN.

BRIEF DESCRIPTION OF DRAWINGS

To describe the technical solutions in the embodiments of the present application more clearly, the following briefly introduces the accompanying drawings for describing the embodiments Apparently, the accompanying drawings in the following description show merely some embodiments of the present application, and persons of ordinary skill in the art may still derive other drawings from the accompanying drawings without creative efforts.

FIG. 5 is a schematic structure diagram of an RNC according to an embodiment of the invention;

FIG. 6 is a flowchart of a method for relocating a UE between radio network controllers according to another embodiment of the invention;

DESCRIPTION OF EMBODIMENTS

The following clearly describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by persons of ordinary skill in the art based on the embodiments of the present disclosure without making creative efforts shall fall within the protection scope of the present disclosure.

In the present disclosure application, the embodiments are described by using a mobile switching center (Mobile Switching Center, MSC) in a CN as an execution subject representing the CN. In practice, network elements that can represent the CN as the execution subject of the embodiments of the invention are not limited to the MSC, which is not limited in the embodiments of the present disclosure.

Figure 1:
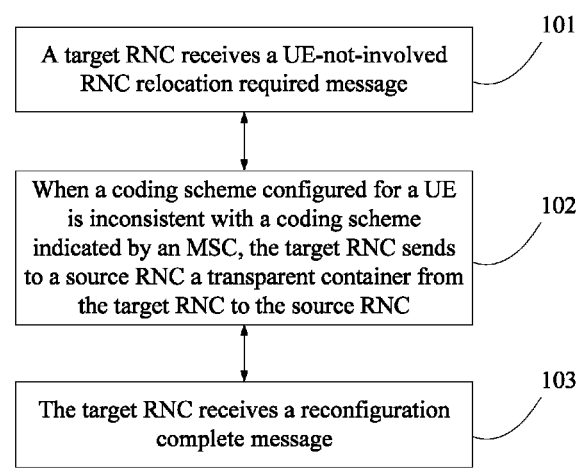
FIG. 1 is a flowchart of a method for relocating a UE between radio network controllers according to an embodiment of the invention.

An embodiment of the present disclosure provides a method for relocating a UE between radio network controllers, as shown in FIG. 1.

101. A target RNC receives a UE-not-involved RNC relocation required message.

The required message comprises a transparent container from a source RNC to the target RNC sent by the source RNC and a coding scheme indicated by an MSC, where the transparent container comprises a coding scheme configured for the UE.

102. When the coding scheme configured for the UE is inconsistent with the coding scheme indicated by the MSC, the target RNC sends the source RNC a transparent container from the target RNC to the source RNC.

The transparent container from the target RNC to the source RNC comprises a reconfiguration message used to change the coding scheme of the UE, so that the source RNC sends a reconfiguration message to the UE.

103. The target RNC receives a reconfiguration complete message.

The reconfiguration complete message is sent by the UE to the target RNC or sent by the UE to the source RNC. If the UE sends the reconfiguration message to the source RNC, the source RNC notifies the target RNC that the reconfiguration is complete.

The target RNC receives the reconfiguration complete message and completes the reconfiguration of the coding scheme for the UE and the relocation of the UE.

With the method for relocating a UE between radio network controllers provided in the embodiments of the invention, the coding scheme configured for the UE can be reconfigured to a coding scheme consistent with the coding scheme indicated by the MSC by carrying the coding scheme to be reconfigured for the UE in the transparent container from the target RNC to the source RNC, when the coding scheme configured for the UE is inconsistent with the coding scheme indicated by the MSC. This solves the problem of a UE relocation failure caused by the inability to initiate a UE-involved RNC relocation process when all radio links of the UE are under control of the target RNC.

Figure 2:
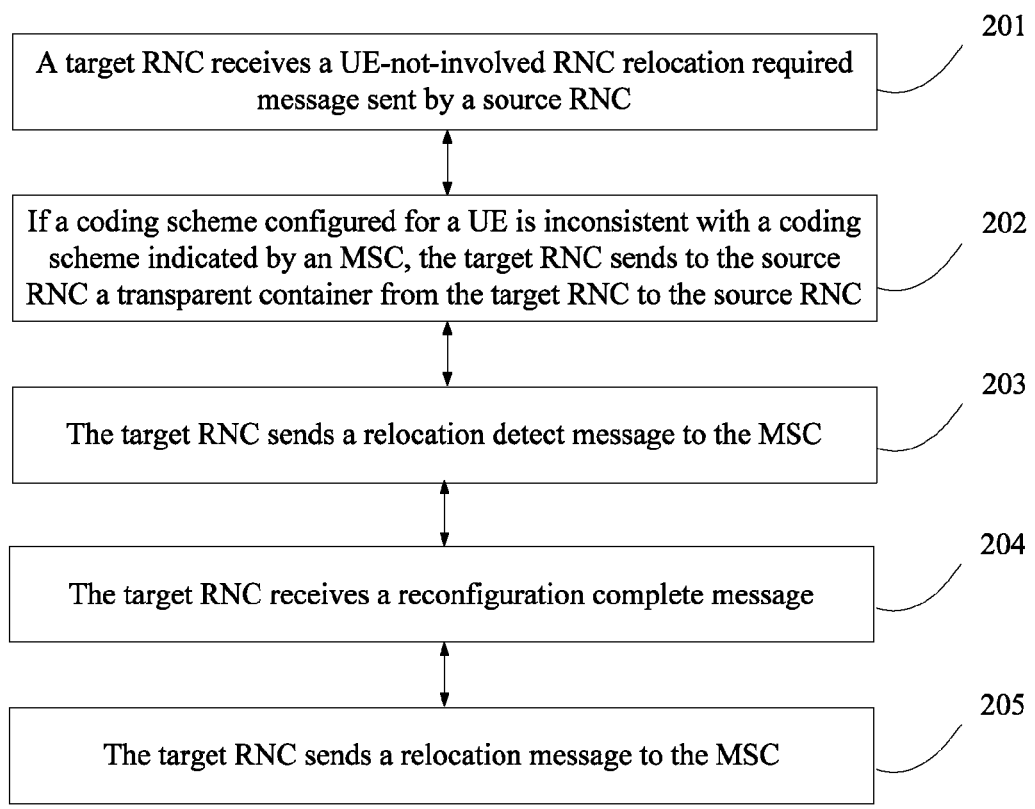
FIG. 2 is a flowchart of a method for relocating a UE between radio network controllers according to another embodiment of the invention.

An embodiment of the present disclosure provides another method for relocating a UE between radio network controllers, as shown in FIG. 2. The method is an extension to the embodiment illustrated in FIG. 1.

201. A target RNC receives a UE-not-involved RNC relocation required message sent by a source RNC.

The relocation required message comprises a transparent container from the source RNC to the target RNC, in which a non access stratum synchronization indication comprises a coding scheme configured for the UE.

202. If the coding scheme configured for the UE is inconsistent with a coding scheme indicated by the MSC, the target RNC sends the source RNC a transparent container from the target RNC to the source RNC.

The non access stratum synchronization indication in the transparent container from the target RNC to the source RNC comprises the coding scheme indicated by the MSC, according to which the source RNC reconfigures the coding scheme configured for the UE.

In one application scenario of this embodiment, the coding scheme configured for the UE is wideband adaptive multi-rate (Wideband Adaptive Multi-Rate, WB AMR) and the coding scheme indicated by the MSC for the UE and the target RNC is narrowband adaptive multi-rate (Narrow Adaptive Multi-Rate, NB AMR). In this case, the coding scheme configured for the UE need be reconfigured. The transparent container from the target RNC to the source RNC comprises the coding scheme (NB AMR) indicated by the MSC for the UE and the target RNC, instructing the source RNC to reconfigure the coding scheme configured for the UE to NB AMR.

203. The target RNC sends a relocation detect message to the MSC.

After receiving a relocation execution trigger, the target RNC sends a relocation detect message to the MSC and starts to operate as an SRNC, and the MSC switches the user plane from the source RNC to the target RNC. The relocation execution trigger may be reception of a reconfiguration complete message on the air interface or reception of an indication on the interface between the source RNC and the target RNC.

204. The target RNC receives a reconfiguration complete message.

The reconfiguration complete message is sent by the UE to the target RNC or sent by the UE to the source RNC. If the UE sends the reconfiguration message to the source RNC, the source RNC notifies the target RNC that the reconfiguration is complete.

205. The target RNC sends a relocation message to the MSC.

The relocation of the UE is completed.

With the method for relocating a UE between radio network controllers provided in the embodiment of the present disclosure, the coding scheme configured for the UE can be reconfigured to a coding scheme consistent with the coding scheme indicated by the MSC by carrying the coding scheme to be reconfigured for the UE in the transparent container from the target RNC to the source RNC, when the coding scheme configured for the UE is inconsistent with the coding scheme indicated by the MSC. This solves the problem of a UE relocation failure caused by the inability to initiate a UE-involved RNC relocation process when all radio links of the UE are under control of the target RNC.

In addition, with the method for relocating a UE between radio network controllers provided in the embodiment of the invention, the UE can be directed relocated to the target RNC after the coding scheme is reconfigured for the UE, sparing the step of initiating a UE-not-involved RNC relocation process by the source RNC after the coding scheme is reconfigured for the UE in the prior art, which saves signaling overhead of the network.

Figure 3:
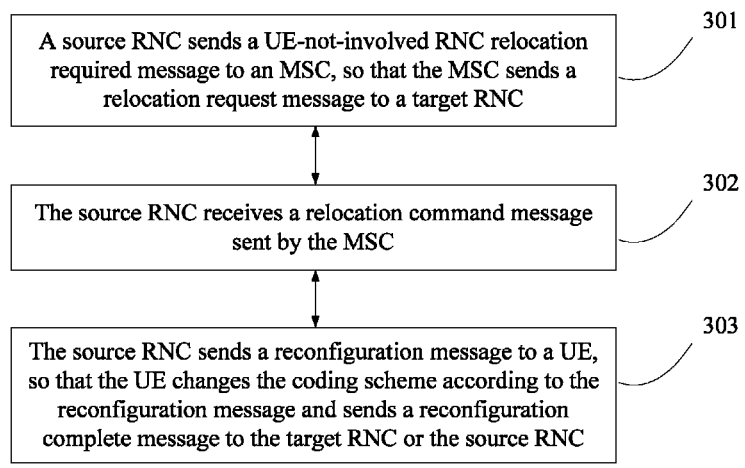
FIG. 3 is a flowchart of a method for relocating a UE between radio network controllers according to another embodiment of the invention.

An embodiment of the present disclosure provides a method for relocating a UE between radio network controllers, as shown in FIG. 3.

301. The source RNC sends a UE-not-involved RNC relocation required message to the MSC, so that the MSC sends a relocation request message to the target RNC.

The relocation request message is used to relocate the UE from the source RNC to the target RNC. When the coding scheme configured for the UE is inconsistent with the coding scheme indicated by the MSC, step 302 is performed to reconfigure the coding scheme configured for the UE.

302. The source RNC receives a relocation command message sent by the MSC.

The relocation command message comprises a transparent container from the target RNC to the source RNC sent by the target RNC. The transparent container comprises a UE coding scheme reconfiguration message. For example, when the coding scheme configured for the UE is WB AMR and the coding scheme indicated by the MSC for the UE and the target RNC is NB AMR, the reconfiguration message comprises NB AMR and the source RNC reconfigures the coding scheme configured for the UE to NB AMR according to the reconfiguration message.

303. The source RNC sends a reconfiguration message to the UE, so that the UE changes the coding scheme according to the reconfiguration message, then sends a reconfiguration complete message to the target RNC or the source RNC.

After changing WB AMR to NB AMR according to the reconfiguration message sent by the source RNC, the UE sends a reconfiguration complete message to the target RNC or the source RNC, indicating completion of the reconfiguration of the coding scheme configured for the UE. If the source RNC receives the reconfiguration complete message, the source RNC notifies the target RNC of the completion of reconfiguration.

With the method for relocating a UE between radio network controllers provided in the embodiment of the present disclosure, the coding scheme configured for the UE can be reconfigured to a coding scheme consistent with the coding scheme indicated by the MSC by carrying the coding scheme to be reconfigured for the UE in the transparent container from the target RNC to the source RNC, when the coding scheme configured for the UE is inconsistent with the coding scheme indicated by the MSC. This solves the issue of UE relocation failure caused by the inability to initiate a UE-involved RNC relocation process when all radio links of the UE are under control of the target RNC.

Figure 4:
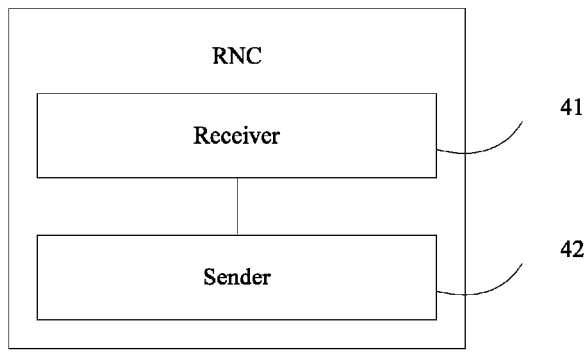
FIG. 4 is a schematic structure diagram of an RNC according to an embodiment of the invention.

With reference to the method embodiment illustrated in FIG. 2, an embodiment of the invention provides an RNC, as shown in FIG. 4, to implement the method embodiment illustrated in FIG. 2. The RNC comprises a receiver 41 and a sender 42.

The receiver 41 is configured to receive a UE-not-involved RNC relocation required message, wherein the required message comprises a transparent container from a source RNC to the target RNC sent by the source RNC and a coding scheme indicated by an MSC, wherein the transparent container comprises a coding scheme configured for the UE.

The relocation required message comprises a transparent container from the source RNC to the target RNC, in which a non access stratum synchronization indication comprises the coding scheme configured for the UE.

The sender 42 is configured to send to the source RNC a transparent container from the target RNC to the source RNC, where the transparent container carriers a reconfiguration message used to change the coding scheme of the UE, so that the source RNC sends a reconfiguration message to the UE.

The non access stratum synchronization indication in the transparent container from the target RNC to the source RNC comprises the coding scheme indicated by the MSC, according to which the source RNC reconfigures the coding scheme configured for the UE.

In one application scenario of the embodiment of the invention, the coding scheme configured for the UE is WB AMR and the coding scheme indicated by the MSC for the UE and the target RNC is NB AMR. In this case, the coding scheme configured for the UE need be reconfigured. The transparent container from the target RNC to the source RNC comprises the coding scheme (NB AMR) indicated by the MSC for the UE and the target RNC, instructing the source RNC to reconfigure the coding scheme configured for the UE to NB AMR.

The receiver 41 is further configured to receive a reconfiguration complete message sent by the UE.

After the coding scheme configured for the UE is reconfigured to NB AMR, the receiver 41 receives a reconfiguration complete message sent by the UE, indicating completion of reconfiguration of the coding scheme for the UE.

With the RNC provided in the embodiment of the present disclosure, the coding scheme configured for the UE can be reconfigured to a coding scheme consistent with the coding scheme indicated by the MSC by carrying the coding scheme to be reconfigured for the UE in the transparent container from the target RNC to the source RNC, when the coding scheme configured for the UE is inconsistent with the coding scheme indicated by the MSC. This solves the problem of a UE relocation failure caused by the inability to initiate a UE-involved RNC relocation process when all radio link of the UE are under control of the target RNC.

In addition, with the RNC provided in the embodiment of the invention, the UE can be directed relocated to the target RNC after the coding scheme is reconfigured for the UE, sparing the step of initiating a UE-not-involved RNC relocation process by the source RNC after the coding scheme is reconfigured for the UE in the prior art, which saves signaling overhead of the network.

With reference to the method embodiment illustrated in FIG. 3, an embodiment of the invention provides an RNC, as shown in FIG. 5, to implement the method embodiment illustrated in FIG. 3. The RNC comprises a sender 51 and a receiver 52.

The sender 51 is configured to send a UE-not-involved RNC relocation required message to an MSC, so that the MSC sends a relocation request message to a target RNC.

The relocation required message is used to relocate the UE from the source RNC to the target RNC. When the coding scheme configured for the UE is inconsistent with the coding scheme indicated by the MSC, the coding scheme configured for the UE is reconfigured.

The receiver 52 is configured to receive the relocation command message sent by the MSC.

The relocation command message comprises a transparent container from the target RNC to the source RNC sent by the target RNC. The transparent container comprises a UE coding scheme reconfiguration message. For example, when the coding scheme configured for the UE is WB AMR and the coding scheme indicated by the MSC for the UE and the target RNC is NB AMR, the reconfiguration message comprises NB AMR and the source RNC reconfigures the coding scheme configured for the UE to NB AMR according to the reconfiguration message.

The sender 51 is further configured to send a reconfiguration message to the UE, so that the UE changes the coding scheme according to the reconfiguration message.

After changing WB AMR to NB AMR according to the reconfiguration message sent by the source RNC, the UE sends a reconfiguration complete message to the target RNC, indicating completion of the reconfiguration of the coding scheme configured for the UE.

With the RNC provided in the embodiment of the present disclosure, the coding scheme configured for the UE can be reconfigured to a coding scheme consistent with the coding scheme indicated by the MSC by carrying the coding scheme to be reconfigured for the UE in the transparent container from the target RNC to the source RNC, when the coding scheme configured for the UE is inconsistent with the coding scheme indicated by the MSC. This solves the problem of a UE relocation failure caused by the inability to initiate a UE-involved RNC relocation process when all radio links of the UE are under control of the target RNC.

Further, an embodiment of the present disclosure provides a system for relocating a UE between radio network controllers. The system covers implementation of the method and apparatus embodiments illustrated in FIGS. 1-5. The system comprises a target RNC and a source RNC.

The target RNC is configured to receive a UE-not-involved RNC relocation required message, wherein the required message comprises a transparent container from the source RNC to the target RNC sent by the source RNC and a coding scheme indicated by an MSC, wherein the transparent container comprises a coding scheme configured for the UE; and if the coding scheme configured for the UE is inconsistent with the coding scheme indicated by the MSC, send the source RNC a transparent container from the target RNC to the source RNC which comprises a reconfiguration message used to change the coding scheme of the UE, so that the source RNC sends a reconfiguration message to the UE.

The source RNC is configured to send the UE-not-involved RNC relocation required message to the MSC, so that the MSC sends a relocation request message to the target RNC; receive a relocation command message sent by the MSC, wherein the relocation command message comprises the transparent container from the target RNC to the source RNC sent by the target RNC, wherein the transparent container comprises the UE coding scheme reconfiguration message; and send the reconfiguration message to the UE so that the UE changes the coding scheme according to the reconfiguration message.

With the system for relocating a UE between radio network controllers provided in the embodiment of the present disclosure, the coding scheme configured for the UE can be reconfigured to a coding scheme consistent with the coding scheme indicated by the MSC by carrying the coding scheme to be reconfigured for the UE in the transparent container from the target RNC to the source RNC, when the coding scheme configured for the UE is inconsistent with the coding scheme indicated by the MSC. This solves the problem of a UE relocation failure caused by the inability to initiate a UE-involved RNC relocation process when all radio link of the UE are under control of the target RNC.

In addition, with the system for relocating a UE between radio network controllers provided in the embodiment of the present disclosure, the UE can be directed relocated to the target RNC after the coding scheme is reconfigured for the UE, sparing the step of initiating a UE-not-involved RNC relocation process by the source RNC after the coding scheme is reconfigured for the UE in the prior art, which saves signaling overhead of the network.

An embodiment of the present disclosure provides a method for relocating a UE between radio network controllers, as shown in FIG. 6.

601. When a relocation process is initiated, if the radio links of a UE are under control of a target RNC, a source RNC determines that the source RNC does not know a coding scheme supported by the target RNC, or determines that a coding scheme configured for the UE is inconsistent with the coding scheme supported by the target RNC, or determines that the UE is provided with a wideband adaptive multi-rate bearer.

602. The source RNC initiates a UE-involved RNC relocation process.

In the UE-involved RC relocation process, the RNC reconfigures the coding scheme for the UE to a coding scheme consistent with the coding scheme supported by the target RNC.

In the prior art, when all radio links of the UE are under control of the target RNC, the RNC is unable to initiate a UE-involved RNC relocation process. If the coding scheme configured for the UE is inconsistent with the coding scheme supported by the target RNC, the source RNC is unable to reconfigure the coding scheme for the UE in the UE-involved RNC relocation process but to reject the relocation of the UE.

With the method for relocating a UE between radio network controllers provided in the embodiment of the present disclosure, a UE-involved RNC relocation process can be initiated when all radio links of the UE are under control of the target RNC, and in the UE-involved RNC relocation process, the coding scheme configured for the UE is reconfigured to a coding scheme consistent with the coding scheme supported by the target RNC, thus ensuring that the UE is successfully relocated to the target RNC.

Figure 7:
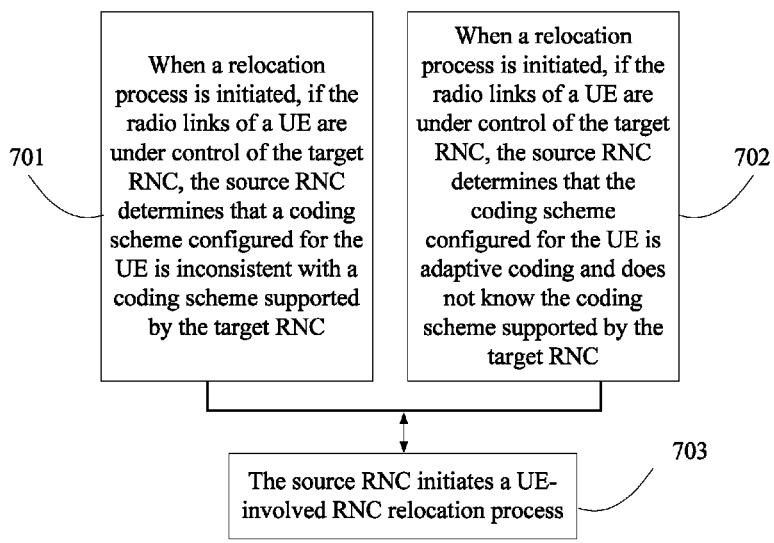
FIG. 7 is a flowchart of a method for relocating a UE between radio network controllers according to another embodiment of the invention.

An embodiment of the present disclosure provides another method for relocating a UE between radio network controllers, as shown in FIG. 7. This method is an extension to the embodiment illustrated in FIG. 6.

701. When a relocation process is initiated, if the radio links of the UE are under control of a target RNC, a source RNC determines that a coding scheme configured for the UE is inconsistent with a coding scheme supported by the target RNC.

There are two implementation manners about determining that the coding scheme configured for the UE is inconsistent with the coding scheme supported by the target RNC:

1) The source RNC judges that the coding scheme configured for the UE is inconsistent with the coding scheme supported by the target RNC.

2) The source RNC receives a relocation failure message sent by the MSC and afterwards learns that the coding scheme configured for the UE is inconsistent with the coding scheme supported by the target RNC.

It should be noted that, in manner 1), before the source RNC judges that the coding scheme configured for the UE is inconsistent with the coding scheme supported by the target RNC, the RNC need to receive the coding scheme supported by the target RNC and sent by a node such as a network management node or the target RNC, so that the source RNC can compare the coding scheme configured for the UE and the coding scheme supported by the target RNC to determine that the coding scheme configured for the UE is inconsistent with the coding scheme supported by the target RNC.

In the embodiment of the present disclosure, the source RNC may determine that the coding scheme configured for the UE is inconsistent with the coding scheme supported by the target RNC through one of but not limited to the above two options. When the source RNC determines that the coding scheme configured for the UE is inconsistent with the coding scheme supported by the target RNC, step 703 is performed.

702. When a relocation process is initiated, if the radio links of the UE are under control of the target RNC, the source RNC determines that the coding scheme configured for the UE is adaptive coding and the source RNC itself does not know the coding scheme supported by the target RNC.

For example, when the coding scheme configured for the UE is wideband adaptive multi-rate (Wideband Adaptive Multi-Rate, WB AMR), step 703 is performed.

In one application scenario of the embodiment of the present disclosure, the MSC indicates a coding scheme for the UE and the target RNC according to the UE supported coding scheme and the target RNC supported coding scheme. The MSC generally indicates a coding scheme based on the coding scheme supported by the target RNC. When the coding scheme configured for the UE is WB AMR but the target RNC supports only narrowband adaptive multi-rate (Narrow Adaptive Multi-Rate, NB AMR), if the MSC instructs the target RNC to use NR AMR, the target RNC cannot exchange data with the UE using WB AMR. In this case, step 703 need be performed to reconfigure the coding scheme configured for the UE from WB AMR to NB AMR, so that the coding scheme configured for the UE is consistent with the coding scheme of the target RNC.

703. The source RNC initiates a UE-involved RNC relocation process.

Figure 8:
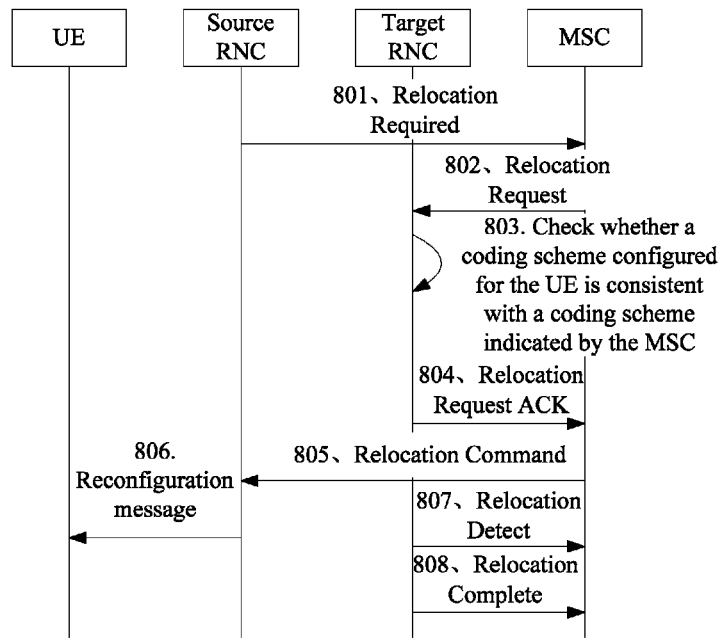
FIG. 8 is a network interaction diagram of a UE-involved RNC relocation process initiated by a source RNC according to an embodiment of the invention.

The coding scheme configured for the UE is reconfigured and the relocation of the UE is complete In the UE-involved RNC relocation process. Specifically, as shown in FIG. 8, that the source RNC initiates a UE-involved RNC relocation process comprises mainly the following steps:

801. The source RNC sends a relocation required message to the MSC.

The Relocation Type therein is set to UE-involved in relocation of SRNS (UE involved-RNC relocation process). This indicates that the relocation process initiated by the source RNC is a UE-involved RNC relocation process. The source RNC indicates the coding scheme configured for the UE in the non access stratum synchronization indication in the transparent container from the source RNC to the target RNC.

802. The MSC sends a relocation request message to the target RNC.

The MSC indicates a coding scheme for the UE and the target RNC according to the target RNC supported coding scheme and the UE supported coding scheme and notifies the target RNC of the indicated coding scheme in the non access stratum synchronization indication.

803. The target RNC checks whether the coding scheme configured for the UE is consistent with the coding scheme indicated by the MSC.

If the target RNC does not support the coding scheme, the target RNC places the coding scheme supported by itself in the transparent container from the target RNC to the source RNC.

804. The target RNC sends the transparent container from the target RNC to the source RNC to the MSC through a relocation request Ack (acknowledgement) message.

805. The MSC sends a relocation command message to the source RNC.

The command comprises the transparent container from the target RNC to the source RNC.

806. The source RNC sends a reconfiguration message to the UE according to the configuration in the transparent container from the target RNC to the source RNC, instructing the UE to reconfigure the coding scheme.

807. The target RNC sends a relocation detect message to the MSC.

The MSC switches the user plane from the source RNC to the target RNC.

808. After receiving a reconfiguration complete message from the UE, the target RNC sends a relocation complete message to the MSC to complete the reconfiguration of the coding scheme configured for the UE and the relocation of the UE.

After receiving a reconfiguration complete message sent by the UE, the source RNC notifies the target RNC of the completion of coding scheme reconfiguration and the target RNC sends a Relocation Complete (relocation complete) message to the MSC to complete the reconfiguration of the coding scheme configured for the UE and the relocation of the UE.

In the UE-involved RNC relocation process shown in FIG. 8, the source RNC reconfigures the coding scheme configured for the UE to the coding scheme supported by the target RNC.

With the method for relocating a UE between radio network controllers provided in the embodiment of the present disclosure, a UE-involved RNC relocation process can be initiated when all radio links of the UE are under control of the target RNC, and, in the UE-involved RNC relocation process, the coding scheme configured for the UE is reconfigured to a coding scheme consistent with the coding scheme supported by the target RNC. This solves the issue of UE relocation failure caused by the inability of the source RNC to initiate a UE-involved RNC relocation process when all radio links of the UE are under control of the target RNC.

In addition, with the method for relocating a UE between radio network controllers provided in the embodiment of the present disclosure, a UE-involved RNC relocation process can be performed when the UE uses WB AMR no matter whether the coding scheme configured for the UE is consistent with the coding scheme supported by the target RNC to reconfigure the coding scheme configured for the UE to the coding scheme supported by the target RNC, thus sparing the step of judging whether the coding scheme of the UE and the coding scheme of the target RNC are consistent.

Figure 9:
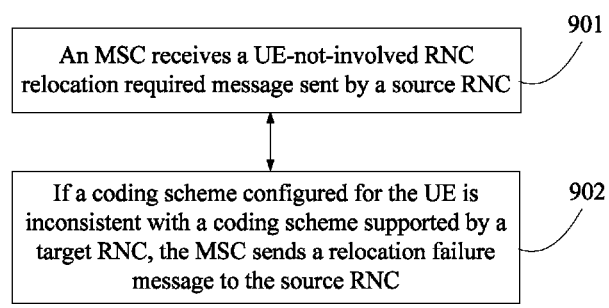
FIG. 9 is a flowchart of a method for relocating a UE between radio network controllers according to another embodiment of the invention.

An embodiment of the present disclosure provides a method for relocating a UE between radio network controllers, as shown in FIG. 9.

901. An MSC receives a UE-not-involved RNC relocation required message sent by a source RNC.

The relocation required message is used for the source RNC to relocate a UE to the target RNC through a UE-not-involved RNC relocation process.

902. If the coding scheme configured for the UE is inconsistent with the coding scheme supported by the target RNC, the MSC sends a relocation failure message to the source RNC.

The relocation failure message comprises an indication, for example, indicating that the coding scheme configured for the UE is inconsistent with the coding scheme supported by the target RNC or instructing the source RNC to initiate a UE-involved RNC relocation process. The source RNC initiates a UE-involved RNC relocation process according to the relocation failure message.

When the coding scheme configured for the UE is inconsistent with the coding scheme supported by the target RNC, the relocation in step 401 fails and the source RNC needs to initiate a UE-involved RNC relocation process according to the relocation failure message sent by the MSC and reconfigure the coding scheme configured for the UE to the coding scheme supported by the target RNC in the relocation process.

With the method for relocating a UE between radio network controllers provided in the embodiment of the present disclosure, a UE-involved RNC relocation process can be initiated when all radio links of the UE are under control of the target RNC, and, in the UE-involved RNC relocation process, the coding scheme configured for the UE is reconfigured to a coding scheme consistent with the coding scheme supported by the target RNC, thus ensuring that the UE is successfully relocated to the target RNC.

Figure 10:
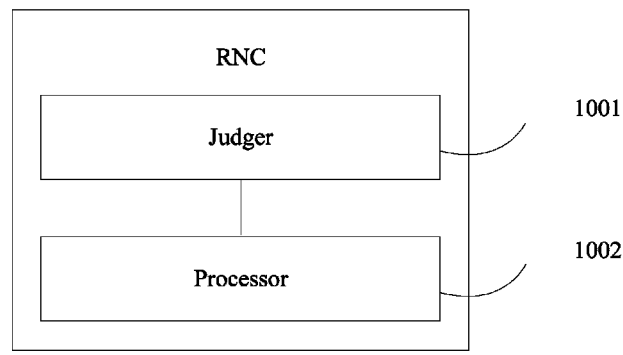
FIG. 10 is a schematic structural diagram of an RNC according to an embodiment of the invention.

With reference to the method embodiment illustrated in FIG. 7, an embodiment of the present disclosure provides an RNC, as shown in FIG. 10, to implement the method embodiment illustrated in FIG. 7. The RNC comprises a judger 1001 and a processor 1002.

The judger 1001 is configured to determine that the source RNC does not know the coding scheme supported by the target RNC or determine that the coding scheme configured for the UE is inconsistent with the coding scheme supported by the target RNC.

The processor 1002 is configured to initiate a UE-involved RNC relocation process.

Figure 11:
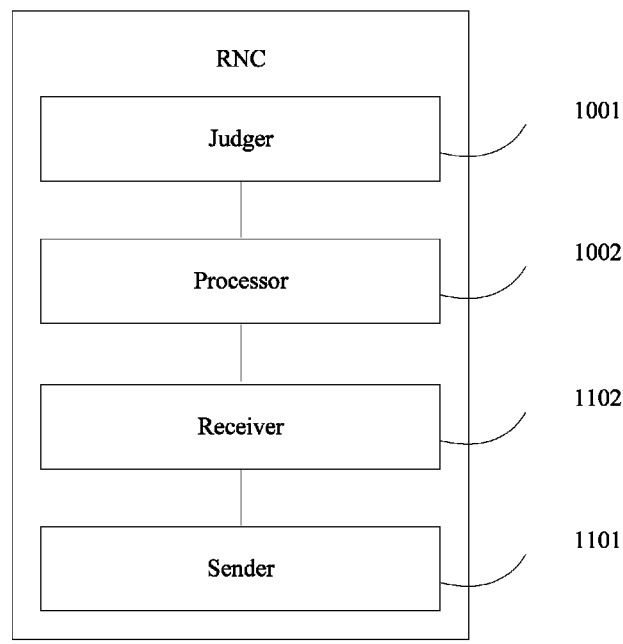
FIG. 11 is a schematic structural diagram of an RNC according to an embodiment of the invention.

Further, as shown in FIG. 11, the RNC may include: a sender 1101, configured to send a UE-not-involved RNC relocation required message to an MSC; and a receiver 1102, configured to receive a relocation failure message sent by the MSC.

The relocation failure message is used to indicate that the coding scheme configured for the UE is inconsistent with the coding scheme supported by the target RNC.

Further, the receiver 1102 is configured to receive the coding scheme supported by the RNC sent by a network management node or the target RNC.

Further, before the judger 1001 determines that the coding scheme configured for the UE is inconsistent with the coding scheme supported by the target RNC, the receiver 1102 receives the coding scheme supported by the target RNC and sent by a node such as a network management system or the target RNC, so that the judger 1001 can compare the coding scheme configured for the UE and the coding scheme supported by the target RNC to determine that the coding scheme configured for the UE is inconsistent with the coding scheme supported by the target RNC.

With the RNC provided in the embodiment of the present disclosure, a UE-involved RNC relocation process can be initiated when all radio links of the UE are under control of the target RNC, and, in the UE-involved RNC relocation process, the coding scheme configured for the UE is reconfigured to a coding scheme consistent with the coding scheme supported by the target RNC. This solves the issue of UE relocation failure caused by the inability to initiate a UE-involved RNC relocation process when the radio links of the UE are under control of the target RNC.

In addition, with the RNC provided in the embodiment of the present disclosure, a UE-involved RNC relocation process can be performed when the UE uses WB AMR no matter whether the coding scheme configured for the UE is consistent with the coding scheme supported by the target RNC to reconfigure the coding scheme configured for the UE to the coding scheme supported by the target RNC, thus sparing the step of judging whether the coding scheme of the UE and the coding scheme of the target RNC are consistent.

Figure 12:
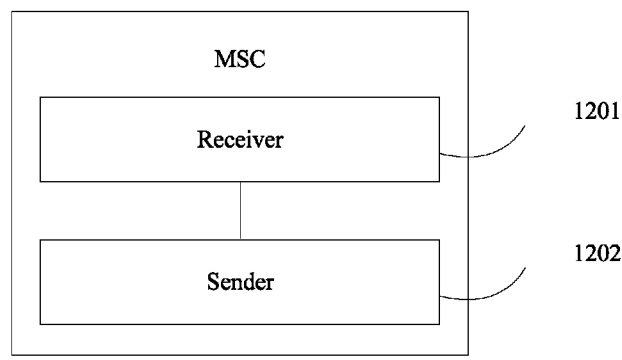
FIG. 12 is a schematic structural diagram of an MSC according to an embodiment of the invention.

With reference to the method embodiment illustrated in FIG. 10, an embodiment of the present disclosure provides an MSC, as shown in FIG. 12, to implement the method embodiment illustrated in FIG. 10. The MSC comprises a receiver 1201 and a sender 1202.

The receiver 1201 is configured to receive a UE-not-involved RNC relocation required message sent by a source RNC.

The relocation required message is used for the source RNC to relocate a UE to the target RNC through a UE-not-involved RNC relocation process.

The sender 1202 is configured to send a relocation failure message to the source RNC.

The source RNC initiates a UE-involved RNC relocation process according to the relocation failure message. When the coding scheme configured for the UE is inconsistent with the coding scheme supported by the target RNC, the source RNC needs to initiate a UE-involved RNC relocation process according to the relocation failure message sent by the MSC and reconfigure the coding scheme configured for the UE to the coding scheme supported by the target RNC in the relocation process.

With the MSC provided in the embodiment of the present disclosure, a UE-involved RNC relocation process can be initiated when all radio links of the UE are under control of the target RNC, and, in the UE-involved RNC relocation process, the coding scheme configured for the UE is reconfigured to a coding scheme consistent with the coding scheme supported by the target RNC, thus ensuring successful relocation of the UE to the target RNC.

Further, an embodiment of the present disclosure provides a system for relocating a UE between radio network controllers. The system covers the implementation of the method and apparatus embodiments illustrated in FIGS. 6-12. The system comprises a source RNC and an MSC.

The source RNC is configured to, when a relocation process is initiated, if the radio links of a UE are under control of a target RNC, determine that the source RNC does not know the coding scheme supported by the target RNC, or determine that the coding scheme configured for the UE is inconsistent with the coding scheme supported by the target RNC, and initiate a UE-involved RNC relocation process.

The MSC is configured to receive a UE-not-involved RNC relocation required message sent by the source RNC, and if the coding scheme configured for the UE is inconsistent with the coding scheme supported by the target RNC, send a relocation failure message to the source RNC, so that the source RNC initiates a UE-involved RNC relocation process according to the relocation failure message.

With the system for relocating a UE between radio network controllers RNCs provided in the embodiment of the present disclosure, a UE-involved RNC relocation process can be initiated when all radio links of the UE are under control of the target RNC, and, in the UE-involved RNC relocation process, the coding scheme configured for the UE is reconfigured to a coding scheme consistent with the coding scheme supported by the target RNC. This solves the issue of UE relocation failure caused by the inability to initiate a UE-involved RNC relocation process when the radio links of the UE are under control of the target RNC.

In addition, with the system for relocating a UE between radio network controllers provided in the embodiment of the present disclosure, a UE-involved RNC relocation process can be performed when the UE uses WB AMR no matter whether the coding scheme configured for the UE is consistent with the coding scheme supported by the target RNC to reconfigure the coding scheme configured for the UE to the coding scheme supported by the target RNC, thus sparing the step of judging whether the coding scheme of the UE and the coding scheme of the target RNC are consistent.

Figure 13:
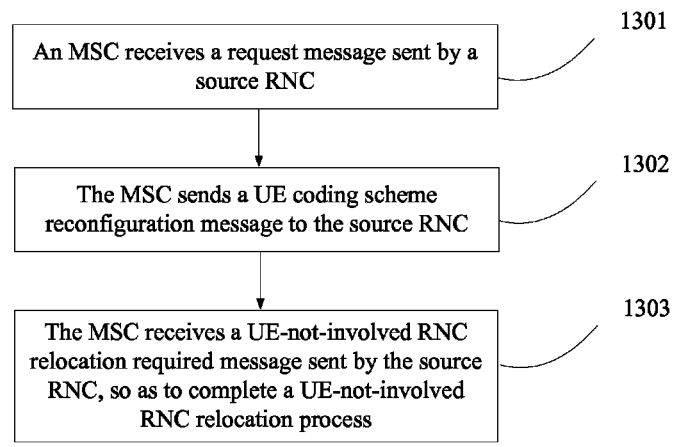
FIG. 13 is a flowchart of a method for relocating a UE between radio network controllers according to another embodiment of the invention.

An embodiment of the present disclosure provides a method for relocating a UE between radio network controllers, as shown in FIG. 13.

1301. An MSC receives a request message sent by a source RNC.

1302. The MSC sends a UE coding scheme reconfiguration message to the source RNC.

If the coding scheme configured for the UE is inconsistent with the coding scheme supported by the target RNC, the MSC sends a UE coding scheme reconfiguration message to the source RNC, to reconfigure the coding scheme configured for the UE.

1303. The MSC receives a UE-not-involved RNC relocation required message sent by the source RNC to complete a UE-not-involved RNC relocation process.

The UE changes the coding scheme according to the reconfiguration message. After the UE changes the coding scheme, the source RNC initiates a UE-not-involved RNC relocation process, thus completing the relocation of the UE.

With the method for relocating a UE between radio network controllers provided in the embodiment of the present disclosure, a reconfiguration message can be sent to the source RNC when the coding scheme configured for the UE is inconsistent with the coding scheme supported by the target RNC, and the source RNC reconfigures the coding scheme configured for the UE according to the reconfiguration message and then initiates a UE-not-involved RNC relocation process to relocate the UE from the source RNC to the target RNC. This solves the issue of UE relocation failure caused by the inconsistency between the coding scheme configured for the UE and the coding scheme indicated by the MSC in the prior art and enables successful relocation of the UE to the target RNC.

Figure 14:
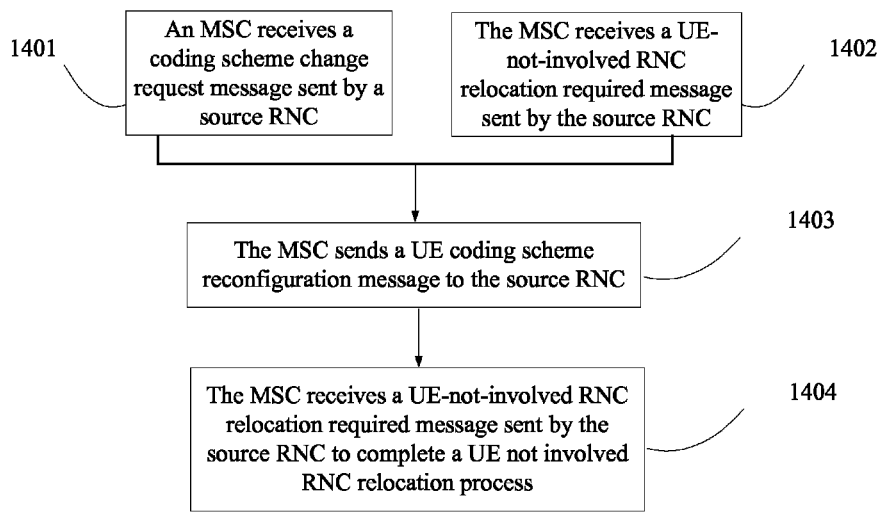
FIG. 14 is a flowchart of a method for relocating a UE between radio network controllers according to another embodiment of the invention.

An embodiment of the present disclosure provides another method for relocating a UE between radio network controllers, as shown in FIG. 14. This method is an extension to the embodiment illustrated in FIG. 13.

1401. An MSC receives a coding scheme change request message sent by a source RNC.

If the source RNC determines that the coding scheme configured for a UE is inconsistent with the coding scheme supported by a target RNC according to the coding scheme configured for a UE and the coding scheme supported by a target RNC, the source RNC sends a coding scheme change request message to the MSC, to reconfigure the coding scheme configured for the UE. The coding scheme change request message comprises the coding scheme designated for the UE.

It should be noted that, a node such as a network management node or the target RNC needs to send the coding scheme supported by the target RNC to the source RNC, so that the source RNC can judge whether the coding scheme configured for the UE is consistent with the coding scheme supported by the target RNC according to the coding scheme configured for the UE and the coding scheme supported by the target RNC.

In one application scenario of the embodiment of the present disclosure, when the coding scheme configured for the UE is WB AMR and the coding scheme supported by the target RNC is NB AMR, the source RNC sends a coding scheme change request message to the MSC, wherein the message comprises a specific indication of coding scheme reconfigured for the UE (NB AMR), and after receiving the coding scheme change request message sent by the source RNC, the MSC executes step 1403 to notify the source RNC to reconfigure the coding scheme configured for the UE to NB AMR according to the coding scheme change request message.

1402. The MSC receives a UE-not-involved RNC relocation required message sent by the source RNC.

If the coding scheme configured for the UE is inconsistent with the coding scheme supported by the target RNC, step 1403 is performed to reconfigure the coding scheme configured for the UE.

1403. The MSC sends a UE coding scheme reconfiguration message to the source RNC.

The UE changes the coding scheme according to the reconfiguration message and the source RNC initiates a UE-not-involved RNC relocation process after the UE changes the coding scheme to complete the relocation of the UE.

In addition, before step 1403, the MSC may first send a relocation failure message to the source RNC, instructing the source RNC to wait to receive a UE coding scheme reconfiguration message or the coding scheme configured for the UE and the coding scheme supported by the target RNC.

It should be noted that, there are two trigger sources for the reconfiguration in this step: 1) the reconfiguration message comes from the coding scheme change request message sent by the source RNC in step 1401, which comprises the coding scheme designated for the UE (such as NB AMR in step 1401). The MSC comprises the coding scheme designated for the UE in the reconfiguration message and sends the message to the source RNC, and the source RNC reconfigures the coding scheme configured for the UE according to the reconfiguration message. 2) The MSC judges that the coding scheme configured for the UE is inconsistent with the coding scheme supported by the target RNC according to the coding scheme configured for the UE and the coding scheme supported by the target RNC and then comprises the coding scheme designated for the UE (such as NB AMR) in the reconfiguration message and sends the message to the source RNC.

1404. The MSC receives a UE-not-involved RNC relocation required message sent by the source RNC to complete a UE-not-involved RNC relocation process.

After receiving the reconfiguration message sent by the MSC, the source RNC reconfigures the coding scheme configured for the UE and then initiates a UE-not-involved RNC relocation process. Because the reconfigured coding scheme configured for the UE is consistent with the coding scheme supported by the target RNC, the UE-not-involved RNC relocation process initiated by the source RNC can relocate the UE to the target RNC.

With the method for relocating a UE between radio network controllers provided in the embodiment of the present disclosure, a reconfiguration message can be sent to the source RNC when the coding scheme configured for the UE is inconsistent with the coding scheme supported by the target RNC, and the source RNC reconfigures the coding scheme configured for the UE according to the reconfiguration message and then initiates a UE-not-involved RNC relocation process to relocate the UE from the source RNC to the target RNC. This solves the issue of UE relocation failure caused by the inconsistency between the coding scheme configured for the UE and the coding scheme supported by the target RNC in the prior art and enables successful relocation of the UE to the target RNC.

Figure 15:
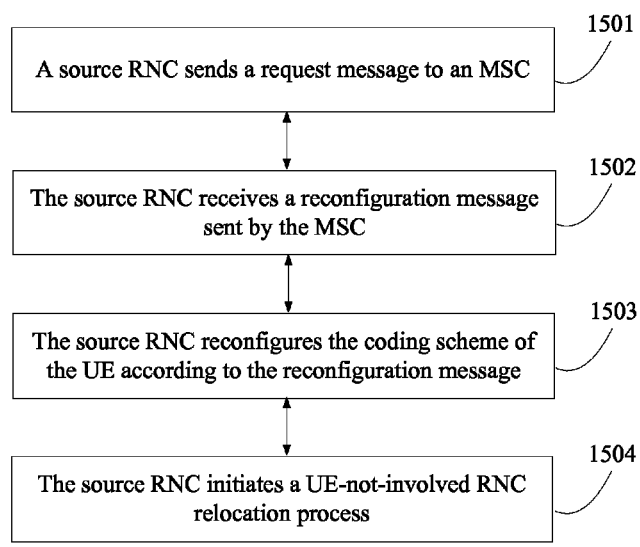
FIG. 15 is a flowchart of a method for relocating a UE between radio network controllers according to another embodiment of the invention.

An embodiment of the present disclosure provides a method for relocating a UE between radio network controllers, as shown in FIG. 15.

1501. A source RNC sends a request message to an MSC.

The request message comprises a coding scheme change request message or a UE-not-involved RNC relocation required message. When the source RNC determines that the coding scheme configured for the UE is inconsistent with the coding scheme supported by the target RNC, the source RNC sends the MSC a coding scheme change request message which comprises a coding scheme designated for the UE.

It should be noted that the source RNC needs to receive the coding scheme supported by the target RNC, which sent by a node such as a network management node or the target RNC, and judges whether the coding scheme configured for the UE is consistent with the coding scheme supported by the target RNC according to the coding scheme configured for the UE and the coding scheme supported by the target RNC.

1502. The source RNC receives a reconfiguration message sent by the MSC.

The relocation message is used to change the coding scheme configured for the UE. There are two trigger sources for the reconfiguration message: 1) the reconfiguration message comes from the coding scheme change request message sent by the source RNC in step 1501, which comprises the coding scheme designated for the UE. The MSC comprises the coding scheme designated for the UE in the reconfiguration message and sends the message to the source RNC, and the source RNC reconfigures the coding scheme configured for the UE according to the reconfiguration message. 2) The MSC judges that the coding scheme configured for the UE is inconsistent with the coding scheme supported by the target RNC according to the coding scheme configured for the UE and the coding scheme supported by the target RNC and then comprises the coding scheme designated for the UE in the reconfiguration message and sends the message to the source RNC.

In addition, before step 1502, the source RNC may first receive a relocation failure message which instructs the source RNC to wait to receive a UE coding scheme reconfiguration message or indicates that the coding scheme configured for the UE is inconsistent with the coding scheme supported by the target RNC.

1503. The source RNC reconfigures the coding scheme for the UE according to the reconfiguration message.

1504. The source RNC initiates a UE-not-involved RNC relocation process.

After reconfiguring the coding scheme configured for the UE according to the reconfiguration message sent by the MSC, the source RNC initiates a UE-not-involved RNC relocation process to complete the relocation of the UE. Because the source RNC reconfigures the coding scheme configured for the UE to a coding scheme consistent with the coding scheme supported by the target RNC according to the reconfiguration message, UE relocation failure caused by the inconsistency between the coding scheme configured for the UE and the coding scheme supported by the target RNC will not occur in the UE-not-involved RNC relocation process initiated by the source RNC, and the UE will be successfully relocated to the target RNC.

With the method for relocating a UE between radio network controllers provided in the embodiment of the present disclosure, a reconfiguration message can be sent to the source RNC when the coding scheme configured for the UE is inconsistent with the coding scheme supported by the target RNC, and the source RNC reconfigures the coding scheme configured for the UE according to the reconfiguration message and then initiates a UE-not-involved RNC relocation process to relocate the UE from the source RNC to the target RNC. This solves the issue of UE relocation failure caused by the inconsistency between the coding scheme configured for the UE and the coding scheme supported by the target RNC in the prior art and enables successful relocation of the UE to the target RNC.

Figure 16:
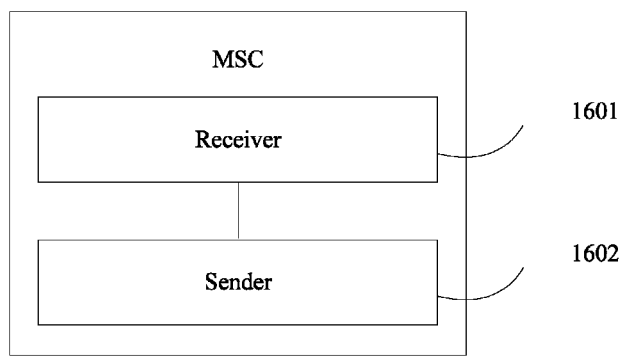
FIG. 16 is a schematic structural diagram of an MSC according to an embodiment of the invention.

With reference to the method embodiment illustrated in FIG. 14, an embodiment of the present disclosure provides an MSC, as shown in FIG. 16, to implement the method embodiment illustrated in FIG. 14. The MSC comprises a receiver 1601 configured to receive a request message sent by the source RNC and a sender 1602 configured to send a UE coding scheme reconfiguration message to the source RNC.

The UE changes the coding scheme according to the reconfiguration message and the source RNC initiates a UE-not-involved RNC relocation process after the UE changes the coding scheme to complete the relocation of the UE.

It should be noted that there are two trigger sources for the reconfiguration message: 1) the reconfiguration message comes from a coding scheme change request message sent by the source RNC, which comprises the coding scheme designated for the UE. The sender 1602 comprises the coding scheme designated for the UE in the reconfiguration message and sends the message to the source RNC, and the source RNC reconfigures the coding scheme configured for the UE according to the reconfiguration message. 2) The MSC judges that the coding scheme configured for the UE is inconsistent with the coding scheme supported by the target RNC according to the coding scheme configured for the UE and the coding scheme supported by the target RNC and then comprises the coding scheme designated for the UE in the reconfiguration message and sends the message to the source RNC.

Further, the receiver 1601 is configured to receive a UE-not-involved RNC relocation required message sent by the source RNC to complete a UE-not-involved RNC relocation process.

Further, the receiver 1601 is specifically configured to receive a coding scheme change request message sent by the source RNC, wherein the coding scheme change request message comprises the coding scheme designated for the UE.

When the source RNC determines that the coding scheme configured for a UE is inconsistent with the coding scheme supported by a target RNC according to the coding scheme configured for a UE and the coding scheme supported by a target RNC, the source RNC sends a coding scheme change request message to the MSC, to reconfigure the coding scheme configured for the UE. The coding scheme change request message comprises the coding scheme designated for the UE.

The sender 1602 is further configured to send the coding scheme supported by the target RNC to the source RNC, so that the source RNC judges whether the coding scheme configured for the UE is consistent with the coding scheme supported by the target RNC according to the coding scheme configured for the UE and the coding scheme supported by the target RNC.

With the MSC provided in the embodiment of the present disclosure, a reconfiguration message can be sent to the source RNC when the coding scheme configured for the UE is inconsistent with the coding scheme supported by the target RNC, and the source RNC reconfigures the coding scheme configured for the UE according to the reconfiguration message and then initiates a UE-not-involved RNC relocation process to relocate the UE from the source RNC to the target RNC. This solves the issue of UE relocation failure caused by the inconsistency between the coding scheme configured for the UE and the coding scheme indicated by the MSC in the prior art and enables successful relocation of the UE to the target RNC.

Figure 17:
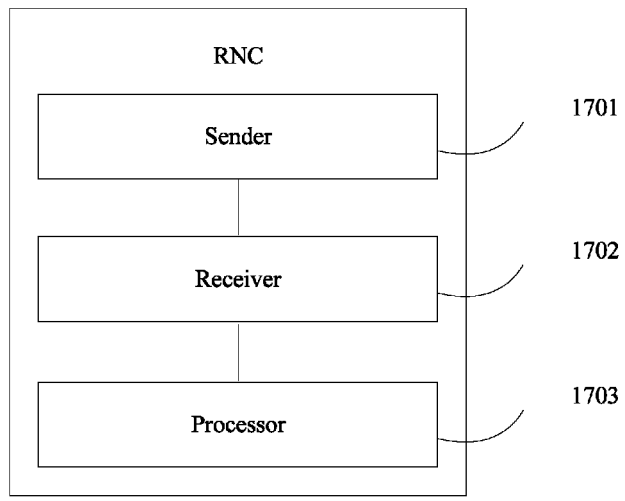
FIG. 17 is a schematic structural diagram of an RNC according to an embodiment of the invention.

With reference to the method embodiment illustrated in FIG. 15, an embodiment of the present disclosure provides an RNC, as shown in FIG. 17, to implement the method embodiment illustrated in FIG. 15. The RNC comprises a sender 1701 configured to send a request message to an MSC and a receiver 1702 configured to receive a reconfiguration message sent by the MSC, which is used to change the coding scheme configured for the UE.

The relocation message is used to change the coding scheme configured for the UE. There are two trigger sources for the reconfiguration message: 1) the reconfiguration message comes from the coding scheme change request message sent by the source RNC, which comprises the coding scheme designated for the UE. The MSC comprises the coding scheme designated for the UE in the reconfiguration message and sends the message to the source RNC, and the source RNC reconfigures the coding scheme configured for the UE according to the reconfiguration message. 2) The MSC judges that the coding scheme configured for the UE is inconsistent with the coding scheme supported by the target RNC according to the coding scheme configured for the UE and the coding scheme supported by the target RNC and then comprises the coding scheme designated for the UE in the reconfiguration message and sends the message to the source RNC.

A processor 1702 is configured to reconfigure the coding scheme for the UE according to the reconfiguration message.

Further, the processor 1703 is configured to, after reconfiguring the coding scheme configured for the UE according to the reconfiguration message sent by the MSC, initiate a UE-not-involved RNC relocation process to complete the relocation of the UE. Because the source RNC reconfigures the coding scheme configured for the UE to a coding scheme consistent with the coding scheme supported by the target RNC according to the reconfiguration message, UE relocation failure caused by the inconsistency between the coding scheme configured for the UE and the coding scheme supported by the target RNC will not occur in the UE-not-involved RNC relocation process initiated by the processor 1703 and the UE will be successfully relocated to the target RNC.

Further, the sender 1701 is specifically configured to send a coding scheme change request message to the MSC, which comprises the coding scheme designated for the UE, or send a UE-not-involved RNC relocation required message to the MSC.

The request message comprises a coding scheme change request message or a UE-not-involved RNC relocation required message. When the source RNC determines that the coding scheme configured for the UE is inconsistent with the coding scheme supported by the target RNC, the source RNC sends the MSC a coding scheme change request message which comprises a coding scheme designated for the UE.

Further, the sender 1701 is configured to, when it is determined that the coding scheme configured for the UE is inconsistent with the coding scheme supported by the target RNC, send a coding scheme change request message to the MSC.

Further, the receiver 1702 is configured to receive the coding scheme supported by the target RNC sent by a node such as a network management node or the target RNC.

Figure 18:
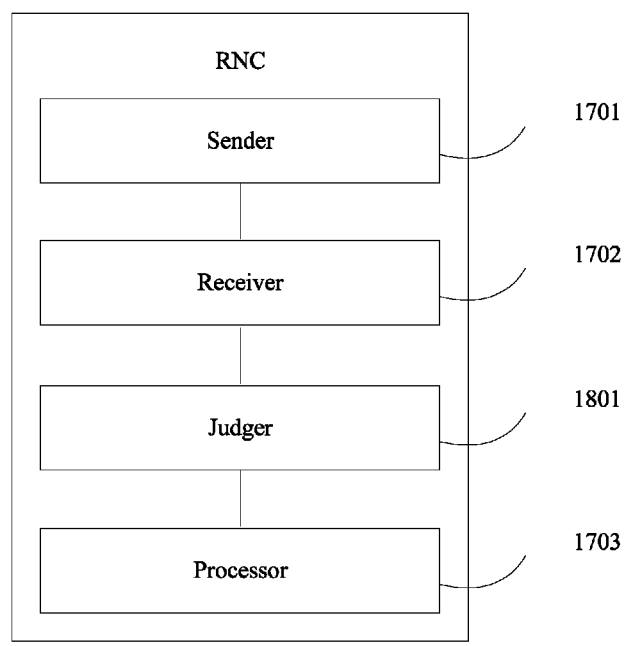
FIG. 18 is a schematic structural diagram of an RNC according to an embodiment of the invention.

Further, as shown in FIG. 18, the RNC comprises a judger 1801, configured to determine that the coding scheme configured for the UE is inconsistent with the coding scheme supported by the target RNC according to the coding scheme configured for the UE and the coding scheme supported by the target RNC.

With the RNC provided in the embodiment of the present disclosure, a reconfiguration message can be sent to the source RNC when the coding scheme configured for the UE is inconsistent with the coding scheme supported by the target RNC, and the source RNC reconfigures the coding scheme configured for the UE according to the reconfiguration message and then initiates a UE-not-involved RNC relocation process to relocate the UE from the source RNC to the target RNC. This solves the problem of a UE relocation failure caused by the inconsistency between the coding scheme configured for the UE and the coding scheme supported by the target RNC in the prior art and enables successful relocation of the UE to the target RNC.

Further, an embodiment of the present disclosure provides a system for relocating a UE between radio network controllers. The system covers the implementation of the method and apparatus embodiments illustrated in FIGS. 13-18. The system comprises an MSC and a source RNC.

The MSC is configured to receive a request message sent by the source RNC, send a UE coding scheme reconfiguration message to the source RNC so that the source RNC reconfigures the coding scheme for the UE, and receive a UE-not-involved relocation required message sent by the source RNC to complete a UE-not-involved RNC relocation process.

The source RNC is configured to send the required message to the MSC, receive the reconfiguration message sent by the MSC, reconfigure the coding scheme for the UE according to the reconfiguration message, and initiate the UE-not-involved RNC relocation process.

With the system for relocating a UE between radio network controllers provided in the embodiment of the present disclosure, a reconfiguration message can be sent to the source RNC when the coding scheme configured for the UE is inconsistent with the coding scheme supported by the target RNC, and the source RNC reconfigures the coding scheme configured for the UE according to the reconfiguration message and then initiates a UE-not-involved RNC relocation process to relocate the UE from the source RNC to the target RNC. This solves the issue of UE relocation failure caused by the inconsistency between the coding scheme configured for the UE and the coding scheme supported by the target RNC in the prior art and enables successful relocation of the UE to the target RNC.

It should be noted that, because the CN (or MSC) indicates a coding scheme for the UE and the target RNC based on the coding scheme supported by the target RNC, the "coding scheme supported by the target RNC" and the "coding scheme indicated by the CN (or MSC) for the UE and the target RNC" described in all embodiments of the present disclosure herein are different expressions of one meaning, which both refer to the coding scheme supported by the target RNC.

Through the foregoing description of the embodiments, it is clear to persons skilled in the art that the present disclosure may be implemented by software plus necessary universal hardware, and definitely may also be implemented by hardware, but in many cases, the software implementation is preferred. Based on such an understanding, the technical solutions of the present disclosure essentially, or the part contributing to the prior art may be implemented in the form of a software product. The computer software product is stored in a readable storage medium, for example, a floppy disk, hard disk, or optical disk of the computer, and comprises several instructions for instructing a computer device (which may be a personal computer, a server, or a network device) to perform the methods described in the embodiments of the present disclosure.

The foregoing descriptions are merely specific embodiments of the present disclosure, but are not intended to limit the protection scope of the present disclosure. Any variation or replacement readily figured out by persons skilled in the art within the technical scope disclosed in the present disclosure shall fall within the protection scope of the present disclosure. Therefore, the protection scope of the present disclosure shall be subject to the protection scope of the claims.

What is claimed is:

1. A method for relocating a user equipment (UE) between radio network controllers, comprising:
   when a relocation is initiated, if radio links of the UE are under control of a target radio network controller (RNC), determining, by a source RNC, that the source RNC does not know a coding scheme supported by the target RNC, or determining that a coding scheme configured for the UE is inconsistent with the coding scheme supported by the target RNC, or determining that the UE is provided with a wideband adaptive multi-rate bearer; and
   initiating, by the source RNC, a UE-involved RNC relocation process.

2. The method according to claim 1, wherein the step of determining that the coding scheme configured for the UE is inconsistent with the coding scheme supported by the target RNC comprises:
   sending a UE-not-involved RNC relocation required message to a core network (CN); and
   receiving a relocation failure message sent by the CN, wherein the relocation failure message indicates that the coding scheme configured for the UE is inconsistent with the coding scheme supported by the target RNC.

3. The method according to claim 2, wherein, if radio links of the UE are under control of the target RNC, the method further comprises:
   receiving the coding scheme supported by the target RNC and sent by a network management node or the target RNC; and
   the step of determining that a coding scheme configured for the UE is inconsistent with the coding scheme supported by the target RNC comprises: determining that the coding scheme configured for the UE is inconsistent with the coding scheme supported by the target RNC and sent by the network management node or the target RNC.

4. A method for relocating a user equipment (UE) between radio network controllers, comprising:
   receiving, by a core network (CN), a UE-not-involved RNC relocation required message sent by a source radio network controller (RNC); and
   if a coding scheme configured for the UE is inconsistent with a coding scheme supported by a target RNC, sending, by the CN, a relocation failure message to the source RNC, to enable the source RNC to initiate a UE-involved RNC relocation process according to the relocation failure message.

5. The method according to claim 4, wherein,
   the relocation failure message comprises an indication, indicating that the coding scheme configured for the UE is inconsistent with the coding scheme supported by the target RNC or instructing the source RNC to initiate the UE-involved RNC relocation process.

6. The method according to claim 4, wherein, the step of sending, by the CN, a relocation failure message to the source RNC, to enable the source RNC to initiate a UE-involved RNC relocation process according to the relocation failure message comprises:
   reconfiguring, by the source RNC, the coding scheme configured for the UE to the coding scheme supported by the target RNC in the UE-involved RNC relocation process.

7. A method for relocating a user equipment (UE) between radio network controllers, comprising:
   sending, by a source radio network controller (RNC), a request message to a core network (CN);
   receiving, by the source RNC, a reconfiguration message sent by the CN;
   reconfiguring, by the source RNC, a coding scheme for the UE according to the reconfiguration message; and
   initiating, by the source RNC, a UE-not-involved RNC relocation process.

8. The method according to claim 7, wherein the step of sending a request message to a CN comprises:
sending a coding scheme change request message to the CN, wherein the message carries a designated coding scheme to be configured for the UE; or
sending a UE-not-involved RNC relocation required message to the CN.

9. The method according to claim 8, wherein, before the sending a coding scheme change request message to the CN, the method further comprises:
receiving a coding scheme supported by a target RNC, which was sent by a network management node or the target RNC; and
determining that the coding scheme configured for the UE is inconsistent with the coding scheme supported by the target RNC.

10. A radio network controller (RNC), comprising:
a judger, configured to: when a relocation is initiated, if radio links of the UE are under control of a target RNC, determine that the RNC does not know a coding scheme supported by the target RNC, or determine that a coding scheme configured for a user equipment (UE) is inconsistent with the coding scheme supported by the target RNC, or determine that the UE is provided with a wideband adaptive multi-rate bearer; and
a processor, configured to: initiate a UE-involved RNC relocation process.

11. The RNC according to claim 10, further comprising:
a sender, configured to: send a UE-not-involved RNC relocation required message to a core network (CN); and
a receiver, configured to: receive a relocation failure message sent by the CN, wherein the relocation failure message indicates that the coding scheme configured for the UE is inconsistent with the coding scheme supported by the target RNC.

12. The RNC according to claim 11, wherein the receiver is further configured to:
receive the coding scheme supported by the target RNC and sent by a network management node or the target RNC; and
the judger is configured to: determine that the coding scheme configured for the UE is inconsistent with the coding scheme supported by the target RNC and sent by the network management node or the target RNC.

* * * * *